June 30, 1964  J. L. BURG  3,138,974
SPINDLE SELECTOR FOR MACHINE HAVING A TURRET HEAD
Filed May 23, 1960  4 Sheets-Sheet 2

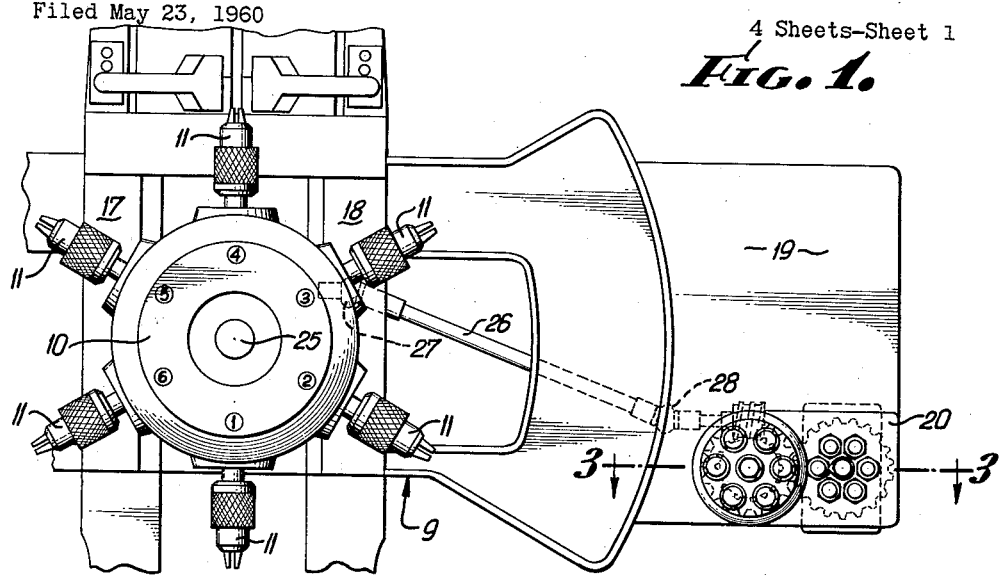
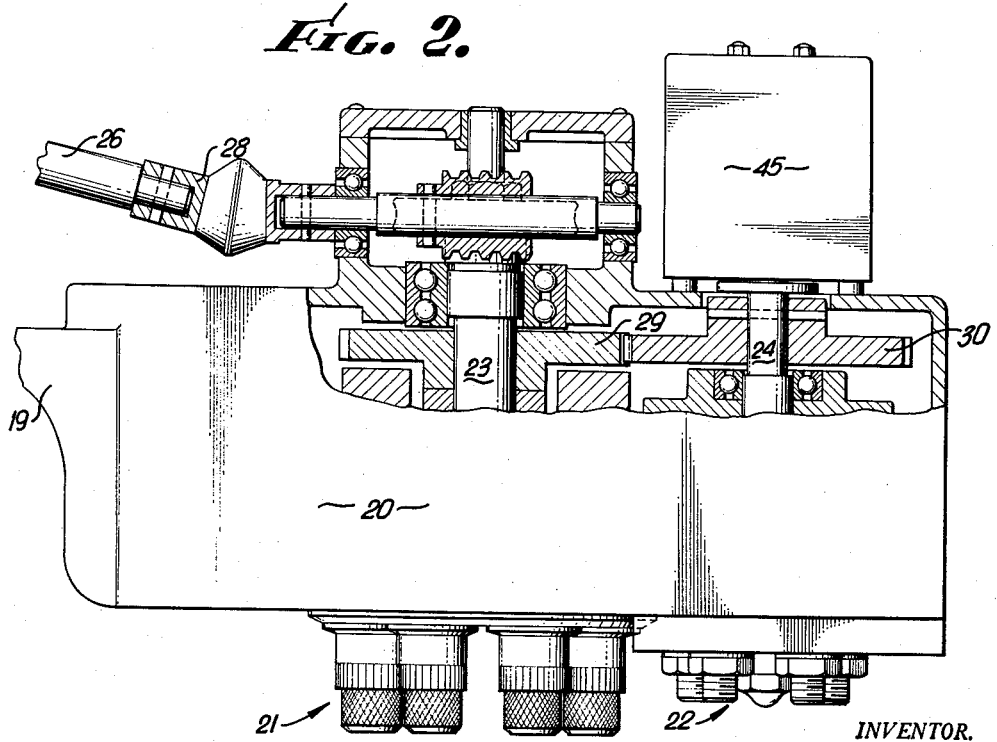

INVENTOR.
JOSEPH L. BURG
BY
Flam and Flam
ATTORNEYS.

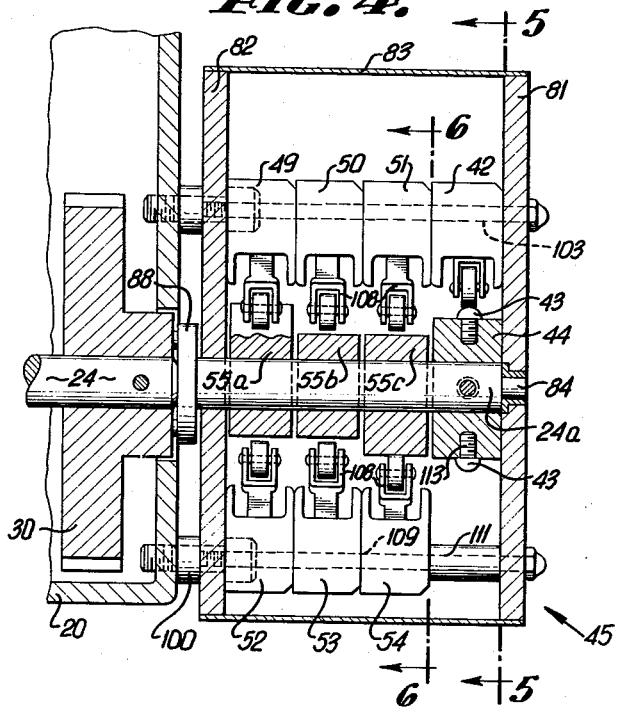
June 30, 1964  J. L. BURG  3,138,974
SPINDLE SELECTOR FOR MACHINE HAVING A TURRET HEAD
Filed May 23, 1960  4 Sheets-Sheet 3
INVENTOR.
JOSEPH L. BURG
BY Flam and Flam
ATTORNEYS.

June 30, 1964  J. L. BURG  3,138,974
SPINDLE SELECTOR FOR MACHINE HAVING A TURRET HEAD
Filed May 23, 1960  4 Sheets-Sheet 4

INVENTOR.
JOSEPH L. BURG
BY
Flam and Flam
ATTORNEYS.

United States Patent Office 3,138,974
Patented June 30, 1964

3,138,974
SPINDLE SELECTOR FOR MACHINE HAVING A TURRET HEAD
Joseph L. Burg, Los Angeles, Calif., assignor, by mesne assignments, to Burgmaster Corporation, Los Angeles, Calif., a corporation of California
Filed May 23, 1960, Ser. No. 31,067
11 Claims. (Cl. 77—25)

This invention relates to machines using rotary tool elements, and particularly to machine utilizing a turret head for supporting a number of rotary tool elements. A machine tool of this general description is shown and described in a prior patent of Fred G. Burg, No. 2,670,636, issued on March 2, 1954, entitled Machine Tool of the Drill Press Type Having Multiple Rotary Tools.

The turret head of such a machine has two distinct motions. First of all, the turret head is capable of indexing whereby the appropriate tool element is placed in operative position. Secondly, the turret head advances and retracts with respect to the work.

One of the primary objects of this invention is to make it possible for turret head machines to be more effectively utilized than heretofore possible. Thus, for example, a machine of this type can readily be programmed so that indexing, advancement, retraction and indexing, etc., proceed in endless progression. But if an intermediate station is not desired, considerable time may be lost by the advancing and retracting movement. Accordingly, the primary object of this invention is to provide a simplified apparatus whereby a selected turret station is reached without any intermediate advancing and retracting movement of the head. To accomplish this purpose, there is provided a new arrangement of circuit elements in cooperation with a one revolution member that controls the indexing movement.

Another object of this invention is to provide a system whereby a push button can be used to select a desired turret head station.

Still another object of this invention is to provide a spindle or turret station selector that can readily be used in combination with electronic programming apparatus.

A further object of this invention is to provide a simplified spindle or turret station selector that expeditiously can be installed as an attachment to an existing machine.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a fragmentary elevation showing a turret head machine incorporating the present invention;

FIG. 2 is an enlarged top plan view of the control panel portion of the machine of FIG. 1, some of the structure being broken away and illustrated in section;

FIG. 4 is a sectional view along a plane indicated by line 4—4 of FIG. 3;

Figure 8:
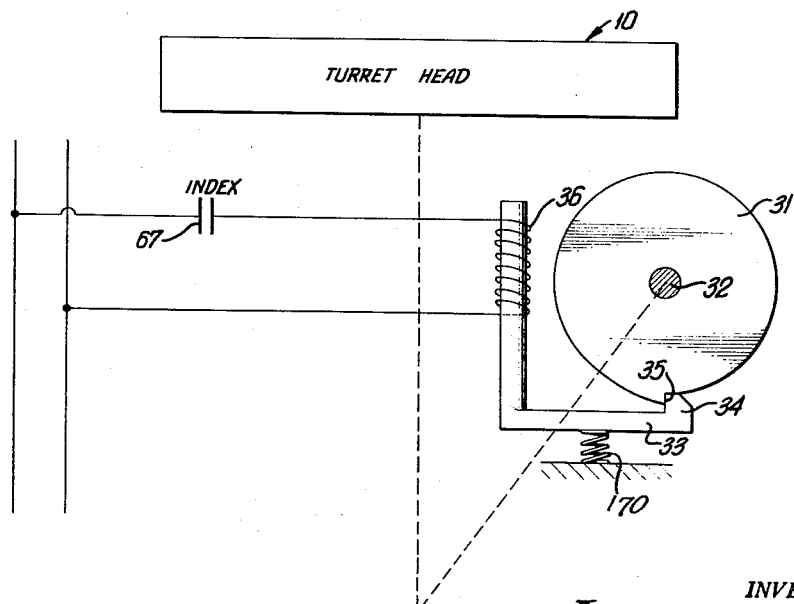
Figure 7:
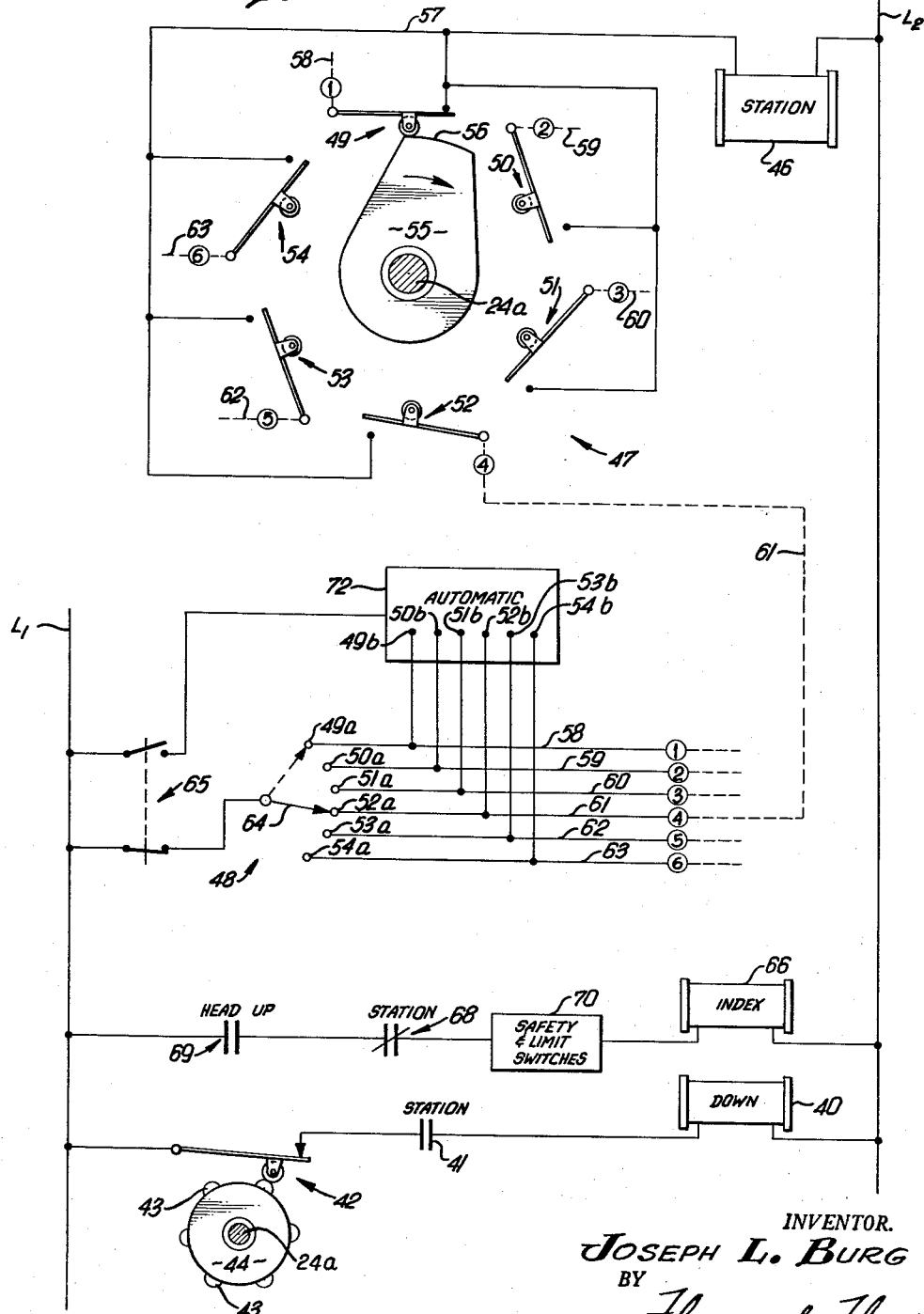

FIGS. 5 and 6 are sectional views taken along planes corresponding to lines 5—5 and 6—6 of FIG. 4;

FIG. 7 is a diagram illustrating the electrical components of the apparatus; and FIG. 8 diagrammatically illustrates a one revolution drive or clutch with which the components cooperate.

In FIG. 1 there is illustrated a turrret head 10 upon which spindles are equiangularly arrayed. By way of example, chucks 11 are shown as mounted upon the ends of the spindles. In this instance there are six stations, numbered 1 to 6 corresponding to the six spindles and checks. The head 10 is mounted for advancing and retracting movement in a vertical direction along the frame of the machine. For this purpose, the head is mounted upon a carriage guidingly received between stationary guide parts 17 and 18 of the frame.

The frame 9 includes a control panel or box 20 mounted upon a laterally projecting part 19 of the frame 9. Within the control box are parts that serve to determine the speed of each of the spindles, for example and as shown and described in a prior patent of Fred G. Burg, No. 2,767,598, issued October 23, 1956, and entitled Speed Control System for Machine Tools. Also accommodated in the control box are parts, as at 22, for determining the rate of flow of liquid or the like to determine the rate of feed of the head 10, in accordance with each individual station.

The devices 21 and 22 must be coordinated with the position of the turret head. For this purpose, the devices 21 and 22 have shafts 23 and 24, the angular positions of which accurately reflect the angular position of the turret head 10. A shaft 25 for the sake of clarity is indicated diagrammatically as being the source of motion for angularly adjusting the head 10. The turret head 10 is thus coupled to the shafts 23 and 24. A coupling is provided in a manner described in said prior Patent No. 2,767,598. The coupling is established and made effective at all times irrespective of the vertical position of the head 10, by utilizing an extensible shaft 26 and universal joints 27 and 28 at opposite ends of the shaft. The universal joints 27 and 28 are connected resectively to the turret head shaft 25 and the shaft 23. The ratio of drive between the turret head shaft 25 and the speed control shaft 23 is precisely 1 to 1. The control shaft 24 for the hydraulic fluid derives its motion from the speed control shaft 23. For this purpose, the shafts 23 and 24 mount intermeshing spur gears 29 and 30 (see also FIG. 3).

When the head 10 is at its upper limit, that is in retracted position with respect to the work, it may be indexed so as to position a succeeding spindle 11. To accomplish this purpose, a one revolution clutch or drive is provided and as disclosed in said prior Patent No. 2,670,636. Another one revolution clutch or drive is shown and described in a prior patent of Fred G. Burg, No. 2,795,307, issued June 11, 1957, entitled Cyclically Operable Power Transmission Mechanism.

In FIG. 8 the operation of the revolution controlled device is diagrammatized. There is illustrated a member 31, supported for rotation about an axis 32, that has an external configuration corresponding to a stepped helix. A locking bar 33 has a projection 34 that is adapted to be engaged by the step 35 of the member 31. When the locking bar 33 is moved outwardly of the axis 32, the step 35 is freed, and the member 31 is capable of rotation. Movement of the member 31 through one revolution causes the turret head 10 to index to the succeeding station, the connection between the member 31 and the head 10 being indicated by dotted lines in FIG. 8. The locking bar 33 is moved to free the member for movement through one revolution by the aid of a solenoid coil 36. A locking pin (not shown) precisely holding the head 10 at a definite angular position is simultaneously released, as is a driving connection to the spindle. The purpose of the structure hereinafter to be described is to permit the one revolution member 31, responsible for indexing movement of the head 10, to go through any number of repeated revolutions (including zero) before any advancing movement of the head takes place. Furthermore, the structure hereinafter to be described conveniently utilizes the timing shafts 23 and 24 of control mechanisms 21 and 22. The manner in which this is accomplished may be described in connection with FIG. 7.

In FIG. 7 there is illustrated a relay 40 that, upon energization, causes the turret head 10 to advance toward the work. Load circuits associated with the relay 40 are not illustrated. The relay 40 is shown with an energization circuit extending between electrical power lines $L_1$ and $L_2$.

Relay contacts are provided in the energization circuit for the down relay 40 that close only when the turret head reaches its selected station. There are two switches that ensure this result. One switch comprises a contact set 41 that closes somewhat in advance of arrival of the head 10 to its selected station, as by operation of a station relay 46 to be hereinafter described. The second switch 42 closes at any time that any spindle or chuck 11, not necessarily the selected one, is precisely on center. The cumulative effect of the switches 41 and 42 is to ensure that the down relay 40 operates only when the selected turret station is precisely on center.

A cam 44 is provided for the switch 42 that, in a manner hereinafter to be described, is mounted on an extension 24a of the shaft 24. The cam 44 has six lobes 43 of limited angular extent that occupy positions respectively reflecting the positions of the spindle stations 1–6 about the turret head shaft 25. When the turret head 10 is precisely on center at any station, the switch 42 accordingly closes.

The station relay 46 can be energized only when the turret head is approaching and when it is at a selected position. For this purpose, a set of switches or circuit controllers is provided, operable in cooperation with a selector switch 48. A switch set 47 as depicted in FIG. 7, comprises a series of normally open switches 49, 50, 51, 52, 53 and 54 located equiangularly about the axis of the shaft extension 24a. Shown mounted upon the shaft extension 24a is a single cam 55. The cam 55 has an operative surface 56 capable of engagement with actuator arms of the switches 50, 51, 52, 53, 54 and 49. The switches 49, 50, 51, 52, 53, and 54 are engaged in endless sequence as the turret head 10 passes in sequence through its successive stations 1–6. Thus, the switches 49, 50, 51, 52, 53 and 54 that correspond in number and angular spacing to the turret head stations 1–6, the legends 1–6 being shown adjacent the switches. The cam 55 has an operative surface 56 capable of engagement with actuator arms of the switches. The cam is so positioned and its surface 56 is of such extent that a switch closes when the turret head 10 is about half way to the corresponding station, and remains closed until the turret head leaves the corresponding station.

The station relay 46 may be energized through any one of the switches 49, 50, 51, 52, 53 and 54. Thus, corresponding terminals of the switches are connected by suitable leads, as at 57, to one side of the relay 46. The other side of the station relay 46 connects to a source line $L_2$. The other terminals of the switches 49, 50, 51, 52, 53 and 54 connect respectively to contacts 49a, 50a, 51a, 52a, 53a and 54a of the selector switch 48 via leads 58, 59, 60, 61, 62 and 63. Intermediate portions of the leads 58, 59, 60, 61, 62 and 63 are deleted for purposes of clarity, but the legends 1–6 adjacent the switches and the connections from the contacts denote the continuity.

Any one of the contacts 49a, 50a, 51a, 52a, 53a and 54a may be connected to the line $L_1$ via a selector switch arm 64. In the present example the switch arm 64 is shown in engagement with the contact 52a, having just been moved from the dotted line position. The turret head has just retracted after operation at station 1, the switch 49 being shown in closed position. The line $L_1$ is now connected to the lead 61 and one terminal of the normally open switch 52, corresponding to station 4. This means that the station relay 46 may be energized only when the cam 55 operates the switch 52. This can occur only when the turret head is approaching or is at station 4. Accordingly, the down relay 40 will not be energized when the turret head reaches or passes through stations 2 and 3 on its way to station 4. During continued indexing movement of the head, motion of the turret head carriage toward the work thus does not occur, and there is no wasted motion.

To control the indexing movement of the turret head, an indexing relay 66 is provided. The relay 66 controls suitable power circuits for the indexing solenoid coil 36 shown in FIG. 8. Normally open relay contacts 67 of the index relay are located serially in a power circuit for the coil 36. When the solenoid coil 36 is energized, the one revolution member 31 is released and indexing movement of the turret head is permitted. As long as the index relay 66 remains energized, the drive member 31 may continue to rotate and cause indexing of the head. The index relay 66 is thus caused to remain energized until the desired station is reached. For this purpose, normally closed relay contacts 68 of the station relay are provided in a series energization circuit for the index relay 66. Thus, a circuit for the index relay extends from the line $L_1$, through normally open switch contacts 69 closed when the turret head is in the up or fully retracted position, normally closed relay switches 68, various safety and limit switches 70, the coil of the index relay 66 and finally to the line $L_2$. The normally closed relay contacts 68 open when the station relay 46 is energized. The station relay 46, as previously described, operates somewhat only in anticipation of the head reaching the selected station. Hence, the index solenoid coil 36 continues to operate until the head approaches its selected position.

When the station relay 46 is energized, however, as the head nears its selected station, the index relay 66 is deenergized, and the index solenoid (FIG. 8) is also deenergized. At this moment the indexing movement has not been completed, and the one revolution member 31 occupies a position about 180° from that shown. A spring 170 causes the projection 34 to engage the external surface of the member 31. The projection 34 stops the member 31 only when indexing movement is completed.

When the turret head is precisely at the selected station the down relay 40 operates.

The head up relay contacts 69 and the energization circuit for the index relay 66 make it possible for the selector switch 48 to be operated even before the turret head moves to its retracted position. Thus, if the switch arm 64 is so moved to a different position, the index relay 66 will not be energized until the head up relay switch 69 closes in response to arrival of the head at its retracted position.

In the event that the switch arm 64 is not moved, there will be no indexing movement at all of the head. This results, for example, when the switch arm 64 remains in the dotted line position corresponding to station 1. When the turret head retracts after operation at station 1, the station relay 46 remains energized due to closure of the switch 49. Thus, the relay controlled contacts 68 remain open. The index relay 66 and the indexing solenoid 36 will not be operated, but the circuit for the down relay 40 will remain operative. Thus, the turret head is sent through another cycle at station 1. If desired, a start-stop switch (not shown) in the circuit for the down relay 40 may be provided. Optionally it may be included in the power circuit controlled by the relay 40.

A cycle of operation may be described with reference to FIG. 7. Let it be assumed that the turret head is at station 1 and that the start-stop switch serially associated with the down relay 40 is open. Let it further be assumed that the switch arm 64 is in the dotted line position. The station relay 46 is energized through the switch 49. Accordingly, the contacts 68 in circuit with the index relay 66 are open, and the head remains at station 1. The contacts 41 in circuit with the down relay 40 are closed. The switch 42 is also closed since the head is precisely at station 1. As soon as the start-stop switch in circuit with the down relay 40 is closed, the turret head will move downwardly.

Let it be assumed that station 4 is next desired. Accordingly, let it be assumed that the switch arm 64 is moved to the full line position illustrated during the cycle of advancing and retracting movement of the head. Such advance movement of the switch arm 64 will be ineffective to cause operation of the index relay 66 because the operation of the index relay 66 depends upon the head up contacts 69. As soon as the turret head reaches the retracted position, a circuit will be completed for the index relay 66. Thus, station relay 46 has been deenergized due to movement of arm 64 to station 4, and contacts 68 are closed. Accordingly, the solenoid 36 (FIG. 8) is energized and the one revolution device 31 is released. The solenoid 36 continues to be energized as long as the station relay 46 remains deenergized due to its normally closed relay contact 68.

The relay 46 becomes energized just as soon as the cam 55 approaches station 4, as by operation of the switch 52 a few degrees in advance of arrival of the head at station 4. The station relay 46 accordingly is energized. The index relay 66 drops out. The contacts 67 (FIG. 8) open and the restraint 34 drops into position shortly before the member 31 has completed its revolution. The member 31, however, does complete its revolution and when the head is precisely at station 4, the switch 42 will close. The station relay 46 being now energized and the contacts 41 also being closed, the down relay 40 is energized causing another cycle of operation.

Instead of a manual selector switch 48, an automatic switching device 72 may be provided. A voltage source may be applied to the leads 58, 59, 60, 61, 62 and 63 via alternate contacts 49b, 50b, 51b, 52b, 53b, and 54b associated with the device 72. The source may be connected to any of these alternate contacts in accordance with information contained on a record in the form of a tape, or the like, the motion of which is, for example, suitably coordinated with other operations of the machine. A switch 65 shifts the system from manual to automatic operation and vice versa by routing the source voltage from line $L_1$ either to the switch arm 64 or to the device 72.

Figure 3:
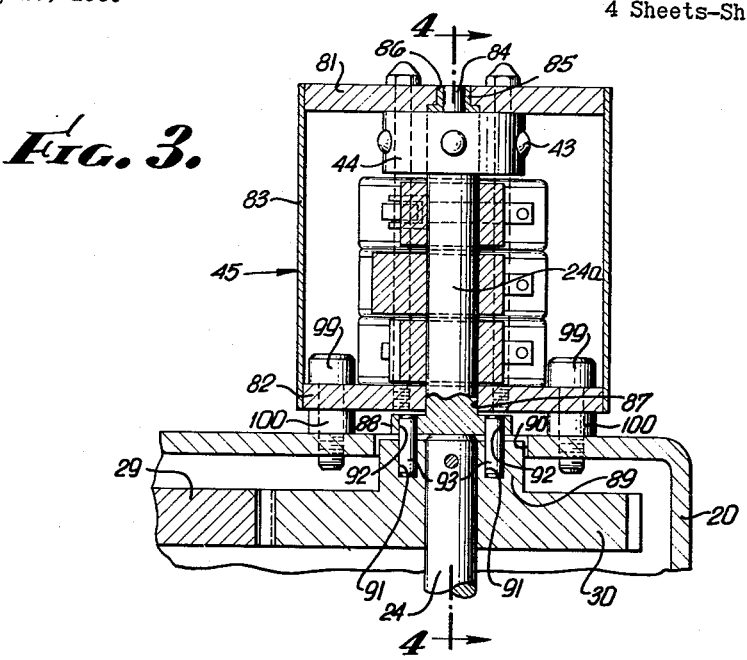
FIG. 3 is an enlarged sectional view taken along a plane indicated by line 3—3 of FIG. 1.

The structure comprising the composite station switch 47 is illustrated clearly in FIGS. 3, 4, 5 and 6. Instead of a single cam 55 as diagrammatically depicted in FIG. 7, cooperating with the six equiangularly arranged switches, the cam is divided into three parts 55a, 55b and 55c (FIG. 6) and the switches are arrayed in two sets on diametrically opposite sides of the cam shaft 24a. This simplifies the assembly and calibration of the device. The casing 45 as shown in FIG. 3, is a preassembled part, housing the shaft part 24a, switches 49, 50, 51, 52, 53 and 54, cams 55a, 55b and 55c, switch 42 and its cam 44.

The casing 45 comprises rear and front generally rectangular mounting plates 81 and 82 located on opposite ends of an open ended shell 83 (FIG. 5). The shaft part 24a is journaled in bearings (FIGS. 3 and 4) provided by the plates 81 and 82.

The shaft part 24a at one end has a flange 88 (FIGS. 3 and 4) and a reduced extension 84 at the other. The part 24a projects into the housing 45 via a central aperture 87 in the front plate 82, the flange 88 being located adjacent the plate 82 on the outside of the housing. The reduced extension 84 at the other end is accommodated in a bearing bushing 85 located at a central aperture 86 in the rear plate.

The flange 88 serves as a means for coupling the shaft 24 to the shaft part 24a.

Thus the flange 88 faces the end surface of the shaft 24 and the hub 89 of the gear 30, which are exposed at an aperture 90 in the control box 20. At the end surface of the gear hub 89 are two recesses 91 aligned with corresponding apertures 92. Coupling pins 93 cooperating with the recesses and apertures effect the coupling.

The casing 45 is secured to the control box 20 by the aid of cap screws 99, the heads of which are located within the casing 45. Spacers 100 interposed between the casing 45 and the box 20 determine adequate clearance for the flange 88.

The shaft part 24a mounts the three cams 55a, 55b and 55c, as well as the cam 44, in side by side relationship axially therealong, as illustrated in FIGS. 3 and 4. Switches 49, 50, 51 and 42 are located above the shaft 24a in axial array corresponding to that of the cams 55a, 55b and 55c and 44. Switches 52, 53 and 54 are diametrically located on the opposite side of the shaft in axial array corresponding to that of cams 55a, 55b and 55c.

The upper set of switches 49, 50, 51 and 42 exactly fit between the plates 81 and 82. They are held in position by the aid of two elongate tie bolts 103 and 104 (see FIG. 6) mounted between the plates 81 and 82. The tie bolts 103 and 104 project through aligned apertures 105 and 106 formed in the casings of the respective switches 42, 51, 50 and 49.

The opposite set of switches 54, 53 and 52 are correspondingly mounted by tie bolts 109 and 110. In the present instance, however, spacers as at 111 and 112 (see FIGS. 4 and 5) are interposed between the end plate 81 and the switch 54 to allow for the cam 44.

The seven switches all have suitable actuator arms 108 aligned in two sets on opposite sides of the shaft 24a. However, the six switches 49, 50, 51, 52, 53 and 54 are operable in 60° spaced relationship by virtue of an angularly staggered relationship of the cams 55a, 55b and 55c. Thus, as the shaft 24a rotates, the switches 49, 50 and 51 are operated in sequence. After the cam part 55c passes beyond the actuator for the switch 51, the cam part 55a extends downwardly for engagement with the switch 52. Accordingly, the switches 52, 53 and 54 are operable in 60° sequence relationship.

The six lobes 43 for the cam 44 are provided by screws 113. These screws or lobes 43 engage the actuator for the switch 42 in a manner previously described to cause closure of the switch 42 every 60°.

By placing the cams 55a, 55b, 55c and 44 in an angularly selected position along the shaft part 24a and by placing the shaft part 24a in an angularly selected position with respect to the gear 30, the device is suitably calibrated.

The selector switch 48, may if desired, be remotely located with the automatic switching device 72.

The inventor claims:

1. The combination including the following elements: a rotatable head carrying tool spindles equiangularly spaced around the axis of the angular movement of the head; means for sequentially indexing the head so as to bring the spindles successively into effective operative position; means for moving the head toward and from the work; a first electric circuit for controlling the indexing movement of the head; a second electric circuit for controlling the movement of the head first toward and then from the work; means selecting the head position at which the second circuit is effective for a cycle of movement of the head toward and from the work; and means rendering the first circuit ineffective while the second circuit is effective.

2. The combination including the following elements:
   a head supported for advancing and retracting movement with respect to its work and for indexing movement among a number of stations;
   interlock means having alternate states;
   first means operably dependent upon the interlock means being in one of its states and upon the head being in a retracted position to cause indexing movement of the head to its adjacent station;
   second means operably dependent upon the interlock means being in the other of its states to cause a cycle of movement of the head toward and from the work;
a movable controller for each station;
means synchronously associated with the angular position of the head for operating each controller when the head is at the corresponding station; and
a number of selectively operable means each operable for switching the interlock means to its said other state, each dependent respectively upon operation of one of said controllers whereby indexing movement of the head ceases when the head reaches a station corresponding to the selected switching means, and whereby the head is conditioned for a cycle of movement toward and from the work.

3. The combination including the following elements:
a head supported for advancing and retracting movement with respect to its work and for indexing movement among a number of stations;
first and a second control means each having two states;
means operably dependent upon the first control means being in one state and upon the head being in a retracted position to cause indexing movement of the head to its adjacent station;
means operably dependent upon the second control means being in one state to cause a cycle of movement of the head toward and from the work;
a movable controller for each station;
means synchronously associated with the angular position of the head for operating each controller when the head is at the corresponding station;
a number of selectively operable means, each operable for switching said first control means to its other state, and said second control means to its said one state, each dependent respectively upon operation of one of said controllers whereby indexing movement of the head ceases when the head reaches a station corresponding to the selected switching means and whereby the head is conditioned for a cycle of movement toward and from the work.

4. The combination including the following elements:
a head supported for advancing and retracting movement with respect to its work and for indexing movement among a number of stations;
interlock means having alternate states;
first means operably dependent upon the interlock means being in one of its states to cause index movement of the head to its adjacent station;
second means operably dependent upon the interlock means being in the other of its states to cause a cycle of movement of the head toward and from the work;
a movable controller for each station;
means synchronously associated with the angular position of the head for operating each controller when the head is at the corresponding station;
a number of selectively operable means each operable for switching the interlock means to its said other state, each dependent respectively upon operation of one of said controllers whereby indexing movement of the head ceases when the head reaches a station corresponding to the selected switching means, and whereby the head is conditioned for a cycle of movement toward and from the work; and
means rendering the first means ineffective during the cycle of movement of the head toward and from the work.

5. The combination including the following elements:
a head supported for advancing and retracting movement with respect to its work and for indexing movement among a number of stations;
an electrically energizable station relay;
first electrical circuit means operably dependent upon the station relay being deenergized and upon the head being in a retracted position to cause indexing movement of the head to its adjacent station;
second electrical circuit means dependent upon the station relay being energized to cause a cycle of movement of the head toward and from the work;
a normally open circuit controller for each station;
means synchronously associated with the angular position of the head for closing each circuit controller when the head is at the corresponding station;
a number of alternate energization circuits for the station relay, each including a selector switch and one of said circuit controllers whereby the station relay is energized to disable the first electrical circuit means and condition the second circuit means thus causing indexing movement to cease and conditioning the head for a cycle of movement toward and from the work.

6. The combination including the following elements:
a head supported for advancing and retracting movement with respect to its work and for indexing movement among a number of stations;
first and second control means each having two states;
means operably dependent upon the first control means being in one state to cause indexing movement of the head to its adjacent station;
means operably dependent upon the second control means being in one state to cause a cycle of movement of the head toward and from the work; and
a number of selectively operable means, each operable for switching said first control means to its other state, and said second control means to its said one state, and each operable upon arrival of the head to a corresponding station whereby indexing movement of the head ceases when the head reaches a selected station and whereby the head is conditioned for a cycle of movement toward and from the work.

7. The combination as set forth in claim 6 in which said means causing indexing movement of the head is dependent upon the head being in a retracted position.

8. The combination as set forth in claim 6 together with programmed means for automatically operating the said selectively operable means in a predetermined sequence.

9. The combination as set forth in claim 6 in which said selectively operable means are each also operable within an angular span extending in advance of arrival of the head to the corresponding station, and in which said means causing a cycle of advancing and retracting movement is also dependent upon the head being precisely centered at a station.

10. The combination including the following elements:
a head supported for advancing and retracting movement with respect to its work and for indexing movement among a number of stations;
an electrically energizable station relay;
a member movable through one revolution for indexing the head to a successive station; a releasable restraint for the member; electromagnetic means energizable to release the restraint; an energization circuit for the electromagnetic means operably dependent upon the station relay being deenergized and upon the head being in a retracted position;
electrical control circuit means dependent upon the station relay being energized and upon the head being precisely at a station to initiate a cycle of movement of the head toward and from the work;
a normally open circuit controller for each station;
means synchronously associated with the angular position of the head for closing each circuit controller when the head is approaching and at the corresponding station;
a number of alternate energization circuits for the station relay, each including a selector switch and one of said circuit controllers whereby the energization circuit for said electromagnetic means is interrupted and the electrical control circuit means is conditioned for operation.

11. The combination including the following elements:
a head rotatable about an axis and carrying tool spindles spaced around said axis;
means for sequentially indexing the head to a number of stations so as to bring the spindles into effective operative position;
means for moving the head toward and from the work; station selecting means;
means for operating the head indexing means when the head is at a station other than that corresponding to the station selecting means; means conditioning the head moving means for operation only when the head is at a station corresponding to the station selecting means; and
means for preventing indexing movement of the head during the work portion of the cycle of movement of the head toward and from the work.

References Cited in the file of this patent

UNITED STATES PATENTS

| | | |
|---|---|---|
| 2,384,809 | Bullard et al. | Sept. 18, 1945 |
| 2,659,960 | Johnson | Nov. 24, 1953 |
| 2,924,127 | Johnson | Feb. 9, 1960 |
| 2,948,166 | Purse et al. | Aug. 9, 1960 |